W. P. SUGG.
DREDGING SLEEVE.
APPLICATION FILED JULY 27, 1908.
947,046.
Patented Jan. 18, 1910.
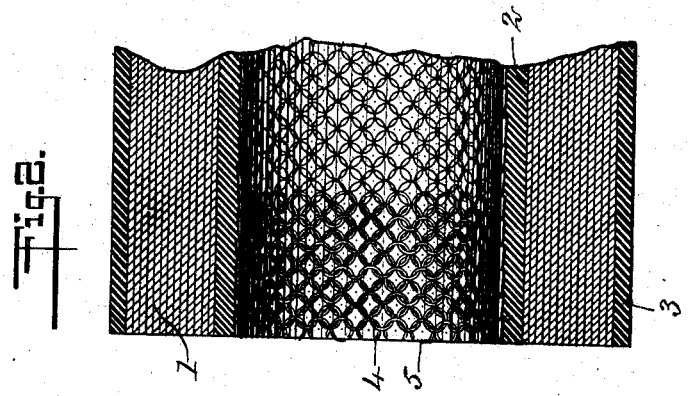
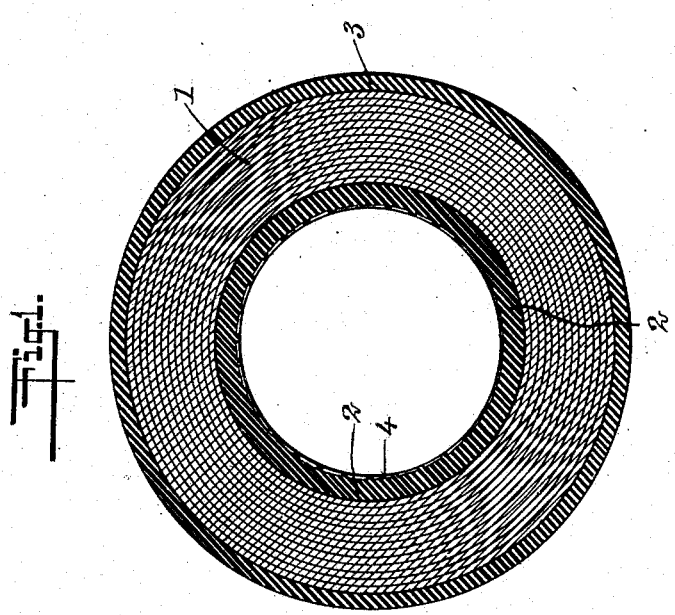
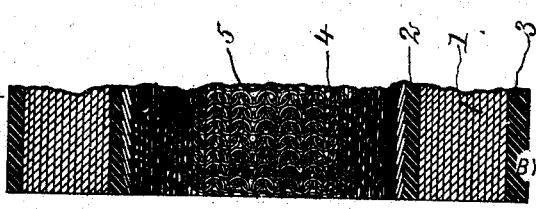
WITNESSES
INVENTOR
Wiley P. Sugg
BY
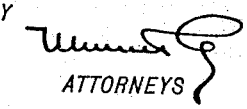
ATTORNEYS

UNITED STATES PATENT OFFICE.

WILEY P. SUGG, OF OAKLAND, CALIFORNIA.

DREDGING-SLEEVE.

947,046.  Specification of Letters Patent.  Patented Jan. 18, 1910.

Application filed July 27, 1908. Serial No. 445,579.

*To all whom it may concern:*

Be it known that I, WILEY P. SUGG, a citizen of the United States, and a resident of Oakland, in the county of Alameda and State of California, have invented a new and Improved Dredging - Sleeve, of which the following is a full, clear, and exact description.

This invention relates to dredging sleeves such as used in connection with dredges which raise the excavated material by means of pumps operating through flexible tubes or hose.

The object of the invention is to produce a dredging sleeve having a protecting wall or coat of mail extending continuously around the axis of the sleeve and protecting it against injury, but at the same time permitting perfect freedom in flexing or doubling the tube. The material raised by the sleeve is composed largely of sand, gravel, and small rocks, which have a tendency to cut into the inner wall of the sleeve, and consequently when this coat of mail or protecting wall is disposed at or near the inner surface of the sleeve it has a specially useful protective effect.

The invention consists in the construction and combination of parts to be more fully described hereinafter and particularly set forth in the claims.

Reference is to be had to the accompanying drawings forming a part of this specification in which similar characters of reference indicate corresponding parts in all the figures.

Figure 1 is a cross section through a sleeve constructed according to my invention; Fig. 2 is a longitudinal section showing a short portion of a sleeve constructed as indicated in Fig. 1, this view showing the protective lining sleeve in its expanded condition; and Fig. 3 is a view similar to Fig. 2, but showing the lining sleeve in a contracted condition.

Referring more particularly to the parts, 1 represents the body of the sleeve which is formed of a plurality of layers of canvas or similar material. This canvas is disposed around an inner tube 2 which is formed of soft rubber or similar material, and the tube is formed with an outer covering or sheath 3 which is also of rubber. Preferably in the inner face of the inner tube 2, there is embedded a protective coat of mail or lining 4 which consists of a continuous inner sleeve or tube formed of chain links 5, said links being in the form of rings. This protective lining is placed in position with its diameter contracted, as indicated in Fig. 3, so that the rings or links 5 of the chain are grouped closely together that is, the links are in a crowded arrangement or relation. This netting in the condition shown in Fig. 1, is pressed into the wall of the inner tube and vulcanized. In this way a protective lining is formed for the inner tube without detracting from the flexibility of the tube, for it will be readily understood that the rings form a pliable mesh or netting. It will be also evident that on account of the contracted condition of the metal lining it will permit the sleeve to expand in the manner indicated in Fig. 2, so that the rings move away from each other as far as possible. In this way a very substantial dredging sleeve is formed which will resist the abrading effect of rocks and sand passing through it, and at the same time has a high degree of flexibility and will adjust itself to the movements of the pontoon or dredge over the side of which it hangs.

After the protective lining is applied to the inner tube, the inner tube is vulcanized.

Having thus described my invention, I claim as new and desire to secure by Letters Patent,—

1. A dredging sleeve having a continuous tube of metal formed of closed links grouped closely together in an overlapped relation forming a protective tube of reduced diameter, said links being arranged so as to separate by sliding upon each other whereby said tube may expand when said sleeve expands.

2. A dredging sleeve having a continuous tubular wall of metal formed of closed links strung together and overlapping with each other in a direction longitudinal of the sleeve and in a transverse direction, said links being normally arranged in a crowded relation whereby said links may slide upon each other to enable said sleeve to be extended longitudinally or expanded.

3. A dredging sleeve having a protective tubular lining extending continuously around the inner wall thereof, said protective lining being formed of closed links normally disposed in a crowded relation and adapted to separate by sliding upon each other and forming an extensible lining, said links being disposed respectively in planes substantially parallel with the axis of said sleeve.

4. A dredging sleeve having a body formed of layers of fabric and an inner tube, said inner tube being formed of rubber, and a protective inner lining for said inner tube extending continuously around the inner wall thereof and formed of closed rings linked together in an overlapping and crowded relation, embedded in the wall of said inner tube and forming a continuous extensible lining, said links being disposed respectively in planes substantially parallel to the axis of said sleeve.

In testimony whereof I have signed my name to this specification in the presence of two subscribing witnesses.

WILEY P. SUGG.

Witnesses:
F. W. HARDEN,
R. BRUMBAUGH.